(12) United States Patent
Jones et al.

(10) Patent No.: US 7,301,930 B2
(45) Date of Patent: Nov. 27, 2007

(54) ENCODER AND METHOD FOR EFFICIENT SYNCHRONISATION CHANNEL ENCODING IN UTRA TDD MODE

(75) Inventors: Alan Edward Jones, Derry Hill (GB); Paul Howard, Bristol (GB)

(73) Assignee: IPWireless, Inc., San Bruno, CA (US)

( * ) Notice: Subject to any disclaimer, the term of this patent is extended or adjusted under 35 U.S.C. 154(b) by 1052 days.

(21) Appl. No.: 10/241,966

(22) Filed: Sep. 12, 2002

(65) Prior Publication Data

US 2003/0138066 A1 Jul. 24, 2003

(30) Foreign Application Priority Data

Sep. 13, 2001 (GB) ................................. 0122109.2

(51) Int. Cl.
*H04B 7/216* (2006.01)
(52) U.S. Cl. ....................... 370/342; 370/350; 370/514; 375/137
(58) Field of Classification Search ................ 370/342, 370/350, 503, 509, 511, 513, 514, 515; 375/135, 375/136, 137
See application file for complete search history.

(56) References Cited

U.S. PATENT DOCUMENTS 5,706,428 A * 1/1998 Boer et al. .................. 370/342

FOREIGN PATENT DOCUMENTS

| EP | 1061682 | 12/2000 |
|---|---|---|
| EP | 1065825 A2 | 1/2001 |
| EP | 1065825 A2 * | 1/2001 |
| EP | 1187369 A2 | 3/2002 |
| WO | WO-00/65736 | 11/2000 |
| WO | WO-00/74276 | 12/2000 |

OTHER PUBLICATIONS

ETSI, "TR 25.895, Version 0.1.0 Analysis of higher chip rates for UTRA TDD evolution", Jan. 2003, 3GPP, p. 11-14.*
Search Report dated Mar. 6, 2003 for GB Application No. GB 0225497.7 filed Nov. 1, 2002, one page.
"3rd Generation Partnership Project; Technical Specification Group Radio Access Network; Spreading and Modulation (TDD) (Release 1999)," (Mar. 2002). 3GPP:Valbonne, France, TS 25.223 v3.8.0:1-20.
"3rd Generation Partnership Project; Technical Specification Group Radio Access Network; Analysis of Higher Chip Rates for UTRA TDD Evolution; (Release 6)," (Mar. 2003). 3GPP:Valbonne, France, TR 25.895 v1.0.0:1-41.
"Universal Mobile Telecommunications System (UMTS); Spreading and Modulation (TDD) (3GPP TS 25.223 version 4.1.0 Release 4)," (Jun. 2001). ETSI TS 125 223 v6.3:1-35.
Great Britain Search Report mailed Apr. 26, 2002, for Great Britain Application No. 0122109.2 filed Sep. 13, 2001, 1 pages.
International Search Report mailed May 15, 2003, for PCT Application No. PCT/GB02/04184 filed Sep. 13, 2002, 3 pages.

* cited by examiner

*Primary Examiner*—Hassan Kizou
*Assistant Examiner*—Brian T O'Connor
(74) *Attorney, Agent, or Firm*—Morrison & Foerster LLP (57) ABSTRACT

An encoder and method for efficient synchronization channel encoding in UTRA TDD mode by: producing a codeword a, where a=dG+z modulo-2, where d represents a predetermined code group to be encoded, G represents a predetermined generator matrix, and z represents a function of the code group number and a row of the generator matrix; producing values $s_k=2a_{2k+1}+a_k$; k=0, 1, 2, 3, and associated values $b_0, b_1, b_2$; and producing a value $S_{ssc}$ associated with the code group, where $S_{ssc}=(b_0 c_{\pi(0)}, b_1 c_{\pi(1)}, b_2 c_{\pi(2)})$, $c_\pi$ represents a code within the code group, and $b_0, b_1, b_2 \in (\pm 1, \pm j)$. This provides an efficient encoding architecture for the synchronization channel in UTRA TDD mode; and, in addition, by simple manipulation of the generation matrix, a higher chip rate signal may be signalled while still preserving the signalling information for the lower chip rate.

26 Claims, 4 Drawing Sheets

**FIG. 1
Prior Art**

| Code Group | Code Set | Frame 1 | | | Frame 2 | | | Associated $t_{offset}$ |
|---|---|---|---|---|---|---|---|---|
| 0 | 1 | $C_1$ | $C_3$ | $C_5$ | $C_1$ | $C_3$ | $-C_5$ | $T_0$ |
| 1 | 1 | $C_1$ | $-C_3$ | $C_5$ | $C_1$ | $-C_3$ | $-C_5$ | $T_1$ |
| 2 | 1 | $-C_1$ | $C_3$ | $C_5$ | $-C_1$ | $C_3$ | $-C_5$ | $T_2$ |
| 3 | 1 | $-C_1$ | $-C_3$ | $C_5$ | $-C_1$ | $-C_3$ | $-C_5$ | $T_3$ |
| 4 | 1 | $jC_1$ | $jC_3$ | $C_5$ | $jC_1$ | $jC_3$ | $-C_5$ | $T_4$ |
| 5 | 1 | $jC_1$ | $-jC_3$ | $C_5$ | $jC_1$ | $-jC_3$ | $-C_5$ | $T_5$ |
| 6 | 1 | $-jC_1$ | $jC_3$ | $C_5$ | $-jC_1$ | $jC_3$ | $-C_5$ | $t_6$ |
| 7 | 1 | $-jC_1$ | $-jC_3$ | $C_5$ | $-jC_1$ | $-jC_3$ | $-C_5$ | $t_7$ |
| 8 | 1 | $jC_1$ | $jC_5$ | $C_3$ | $jC_1$ | $jC_5$ | $-C_3$ | $t_8$ |
| 9 | 1 | $jC_1$ | $-jC_5$ | $C_3$ | $jC_1$ | $-jC_5$ | $-C_3$ | $t_9$ |
| 10 | 1 | $-jC_1$ | $jC_5$ | $C_3$ | $-jC_1$ | $jC_5$ | $-C_3$ | $t_{10}$ |
| 11 | 1 | $-jC_1$ | $-jC_5$ | $C_3$ | $-jC_1$ | $-jC_5$ | $-C_3$ | $t_{11}$ |
| 12 | 1 | $jC_3$ | $jC_5$ | $C_1$ | $jC_3$ | $jC_5$ | $-C_1$ | $t_{12}$ |
| 13 | 1 | $jC_3$ | $-jC_5$ | $C_1$ | $jC_3$ | $-jC_5$ | $-C_1$ | $t_{13}$ |
| 14 | 1 | $-jC_3$ | $jC_5$ | $C_1$ | $-jC_3$ | $jC_5$ | $-C_1$ | $t_{14}$ |
| 15 | 1 | $-jC_3$ | $-jC_5$ | $C_1$ | $-jC_3$ | $-jC_5$ | $-C_1$ | $t_{15}$ |
| 16 | 2 | $C_{10}$ | $C_{13}$ | $C_{14}$ | $C_{10}$ | $C_{13}$ | $-C_{14}$ | $t_{16}$ |
| 17 | 2 | $C_{10}$ | $-C_{13}$ | $C_{14}$ | $C_{10}$ | $-C_{13}$ | $-C_{14}$ | $t_{17}$ |
| ... | ... | ... | ... | ... | ... | ... | ... | ... |
| 20 | 2 | $jC_{10}$ | $jC_{13}$ | $C_{14}$ | $jC_{10}$ | $jC_{13}$ | $-C_{14}$ | $t_{20}$ |
| ... | ... | ... | ... | ... | ... | ... | ... | ... |
| 24 | 2 | $jC_{10}$ | $jC_{14}$ | $C_{13}$ | $jC_{10}$ | $jC_{14}$ | $-C_{13}$ | $t_{24}$ |
| ... | ... | ... | ... | ... | ... | ... | ... | ... |
| 31 | 2 | $-jC_{13}$ | $-jC_{14}$ | $C_{10}$ | $-jC_{13}$ | $-jC_{14}$ | $-C_{10}$ | $t_{31}$ |

FIG. 2

| Code Group | Code Set | Frame 1 | | | | Frame 2 | | | | Associated $t_{offset}$ |
|---|---|---|---|---|---|---|---|---|---|---|
| | | Slot k | | Slot k+8 | | Slot k | | Slot k+8 | | |
| 0 | 1 | $C_1$ | $C_3$ | $C_5$ | $-C_5$ | $-C_1$ | $-C_3$ | $-C_5$ | $-C_5$ | $t_0$ |
| 1 | 1 | $C_1$ | $-C_3$ | $C_5$ | $-C_5$ | $-C_1$ | $C_3$ | $-C_5$ | $-C_5$ | $t_1$ |
| 2 | 1 | $jC_1$ | $jC_3$ | $C_5$ | $jC_3$ | $-jC_1$ | $-jC_3$ | $C_5$ | $-C_5$ | $t_2$ |
| 3 | 1 | $jC_1$ | $-jC_3$ | $C_5$ | $-jC_3$ | $-jC_1$ | $jC_3$ | $C_5$ | $-C_5$ | $t_3$ |
| 4 | 1 | $jC_1$ | $jC_5$ | $C_3$ | $jC_5$ | $-jC_1$ | $-jC_5$ | $C_3$ | $-C_3$ | $t_4$ |
| 5 | 1 | $jC_3$ | $jC_5$ | $C_1$ | $-jC_5$ | $-jC_3$ | $-jC_5$ | $C_1$ | $-C_3$ | $t_5$ |
| 6 | 1 | $jC_3$ | $-jC_5$ | $C_1$ | $-jC_5$ | $-jC_3$ | $jC_5$ | $C_1$ | $-C_1$ | $t_6$ |
| 7 | 1 | $jC_3$ | $-jC_5$ | $C_1$ | $-jC_5$ | $-jC_3$ | $jC_5$ | $C_1$ | $-C_1$ | $t_7$ |
| 8 | 2 | $C_{10}$ | $C_{13}$ | $C_{14}$ | $-C_{13}$ | $-C_{10}$ | $-C_{13}$ | $C_{14}$ | $-C_{14}$ | $t_8$ |
| 9 | 2 | $C_{10}$ | $-C_{13}$ | $C_{14}$ | $-C_{13}$ | $-C_{10}$ | $C_{13}$ | $C_{14}$ | $-C_{14}$ | $t_9$ |
| 10 | 2 | $jC_{10}$ | $jC_{13}$ | $C_{14}$ | $jC_{13}$ | $-jC_{10}$ | $-jC_{13}$ | $C_{14}$ | $-C_{14}$ | $t_{10}$ |
| 11 | 2 | $jC_{10}$ | $-jC_{13}$ | $C_{14}$ | $-jC_{13}$ | $-jC_{10}$ | $jC_{13}$ | $C_{14}$ | $-C_{14}$ | $t_{11}$ |
| 12 | 2 | $jC_{10}$ | $-jC_{14}$ | $C_{13}$ | $-jC_{14}$ | $-jC_{10}$ | $jC_{14}$ | $C_{13}$ | $-C_{13}$ | $t_{12}$ |
| 13 | 2 | $jC_{10}$ | $jC_{14}$ | $C_{13}$ | $jC_{14}$ | $-jC_{10}$ | $-jC_{14}$ | $C_{13}$ | $-C_{13}$ | $t_{13}$ |
| 14 | 2 | $jC_{13}$ | $jC_{14}$ | $C_{10}$ | $-jC_{14}$ | $-jC_{13}$ | $-jC_{14}$ | $C_{10}$ | $-C_{10}$ | $t_{14}$ |
| 15 | 2 | $jC_{13}$ | $-jC_{14}$ | $C_{10}$ | $-jC_{14}$ | $-jC_{13}$ | $jC_{14}$ | $C_{10}$ | $-C_{10}$ | $t_{15}$ |
| 16 | 3 | $C_0$ | $C_6$ | $C_{12}$ | $C_6$ | $-C_0$ | $-C_6$ | $C_{12}$ | $-C_{12}$ | $t_{16}$ |
| ... | ... | ... | ... | ... | ... | ... | ... | ... | ... | ... |
| 23 | 3 | $jC_6$ | $-jC_{12}$ | $C_0$ | $-jC_{12}$ | $-jC_6$ | $jC_{12}$ | $C_0$ | $-C_0$ | $t_{20}$ |
| 4 | 4 | $C_4$ | $C_8$ | $C_{15}$ | $C_8$ | $-C_4$ | $-C_8$ | $C_{15}$ | $-C_{15}$ | $t_{24}$ |
| ... | ... | ... | ... | ... | ... | ... | ... | ... | ... | ... |
| 31 | 4 | $jC_8$ | $-jC_{15}$ | $C_4$ | $-jC_{15}$ | $-jC_8$ | $jC_{15}$ | $C_4$ | $-C_4$ | $t_{31}$ |

ENCODER AND METHOD FOR EFFICIENT SYNCHRONISATION CHANNEL ENCODING IN UTRA TDD MODE

FIELD OF THE INVENTION

This invention relates to wireless communication networks and particularly to UTRA (Universal Mobile Telephone System Terrestrial Radio Access) networks operating in TDD (Time Division Duplex) mode.

BACKGROUND OF THE INVENTION

In UTRA TDD mode the synchronisation channel (SCH) has two functions. The primary function is to provide a signal that enables a 'UE' (user equipment, such as a wireless terminal) to search for and identify a 'Node B' (i.e, a wireless Base Station of a UMTS system). The secondary function is to provide sufficient information to allow a UE to demodulate a P-CCPCH (Primary Common Control Physical CHannel) transmission and obtain the system information, sent on the BCH (Broadcast Channel) transport channel which is carried by the P-CCPCH, needed in order to be able to communicate with the network.

There are two cases of SCH and P-CCPCH allocation as follows:
- Case 1) SCH and P-CCPCH allocated in timeslot #k, where k=0 . . . 14
- Case 2) SCH allocated in two timeslots: timeslot #k and timeslot #k+8, where k=0 . . . 6; P-CCPCH allocated in timeslot #k where timeslot #k is the $k^{th}$ timeslot. Due to this SCH scheme, the position of P-CCPCH is known from the SCH. The SCH consists of one real-valued primary synchronisation code (PSC) and three complex secondary synchronisation codes (SSCs), all of length 256 chips. The PSC is common for all Node Bs, but the SSCs are Node B specific. The PSC and SSC are transmitted simultaneously from a given Node B at a specific fixed time offset ($t_{offset}$) from the start of time slot 0. The time offset is included to prevent the possible capture effect that would otherwise occur as a consequence of all Node Bs transmitting the common primary code at the same time.

Considering a network where multi-chip rates are supported, in an initial start-up condition, the UE will not be aware of the chip rate that is available. To cope with this situation, it is known for the SCH to be always transmitted at a fixed chip rate (e.g., 3.84Mcps), and for the chip rate being used in the cell by the other transport channels to be signalled to the UEs by using the secondary synchronisation code, SSC (by modulating the secondary sequences).

Heretofore, this has been done by storing code group and frame position information defining the codes in tables in memory in the network and UE. However, the amount of information needing to be stored in this way may be considerable.

A need therefore exists for efficient synchronisation channel encoding in UTRA TDD mode wherein the abovementioned disadvantage(s) may be alleviated.

STATEMENT OF INVENTION

In accordance with a first aspect of the present invention there is provided a method for efficient synchronisation channel encoding in UTRA TDD mode, comprising:

producing a codeword a, where a=dG+z modulo-2, where d represents a predetermined code group to be encoded, G represents a predetermined generator matrix, and z represents a function of the code group number and a row of the generator matrix, producing values $s_k=2a_{2k+1}+a_{2k}$; k=0, 1, 2, 3, and associated values $b_0,b_1,b_2$, and producing a value $S_{ssc}$ associated with the code group, where $S_{ssc}=(b_0 c_{\pi(0)},b_1 c_{\pi(1)},b_2 c_{\pi(2)})$, $c_\pi$ represents a code within the code group, and $b_0,b_1,b_2 \in (\pm 1,\pm j)$.

In accordance with a second aspect of the present invention there is provided a method for efficient synchronisation channel encoding in UTRA TDD mode, comprising:

producing a codeword from a predetermined code group to be encoded, a predetermined generator matrix G, and a function of the code group number and a row of the generator matrix, and producing a value $S_{ssc}$ associated with the code group, where $S_{ssc}=(b_0 c_{\pi(0)},b_1 c_{\pi(1)},b_2 c_{\pi(2)})$, $c_\pi$ represents a code within the code group, and $b_0,b_1,b_2 \in (\pm 1,\pm j)$, wherein the generator matrix has values such that a parameter produced therefrom changes between a first value indicating a first chip rate and a second value indicating a second chip rate.

In accordance with a third aspect of the present invention there is provided an encoder for efficient synchronisation channel encoding in UTRA TDD mode, comprising:

means for producing a codeword a, where a=dG+z modulo-2, where d represents a predetermined code group to be encoded, G represents a predetermined generator matrix, and z represents a function of the code group number and a row of the generator matrix, means for producing values $s_k=2a_{2k+1}+a_{2k}$; k=0, 1, 2, 3, and associated values $b_0,b_1,b_2$, and means for producing a value $S_{ssc}$ associated with the code group, where $S_{ssc}=(b_0 c_{\pi(0)},b_1 c_{\pi(1)},b_2 c_{\pi(2)})$, $c_\pi$ represents a code within the code group and $b_0,b_1,b_2 \in (\pm 1,\pm j)$.

In accordance with a fourth aspect of the present invention there is provided an encoder for efficient synchronisation channel encoding in UTRA TDD mode, comprising:

means for producing a codeword from a predetermined code group to be encoded, a predetermined generator matrix G, and a function of the code group number and a row of the generator matrix, and means for producing a value $S_{ssc}$ associated with the code group, where $S_{ssc}=(b_0 c_{\pi(0)},b_1 c_{\pi(1)},b_2 c_{\pi(2)})$, $c_\pi$ represents a code within the code group, and $b_0,b_1,b_2 \in (\pm 1, \pm j)$, wherein the generator matrix has values such that a parameter produced therefrom changes between a first value indicating a first chip rate and a second value indicating a second chip rate.

BRIEF DESCRIPTION OF THE DRAWINGS

One encoder and method for efficient synchronisation channel encoding in UTRA TDD mode incorporating the present invention will now be described, by way of example only, with reference to the accompanying drawings, in which:

FIG. 3 shows in tabular form code allocation for CASE 2; and

DESCRIPTION OF PREFERRED EMBODIMENT(S)

Figure 1:
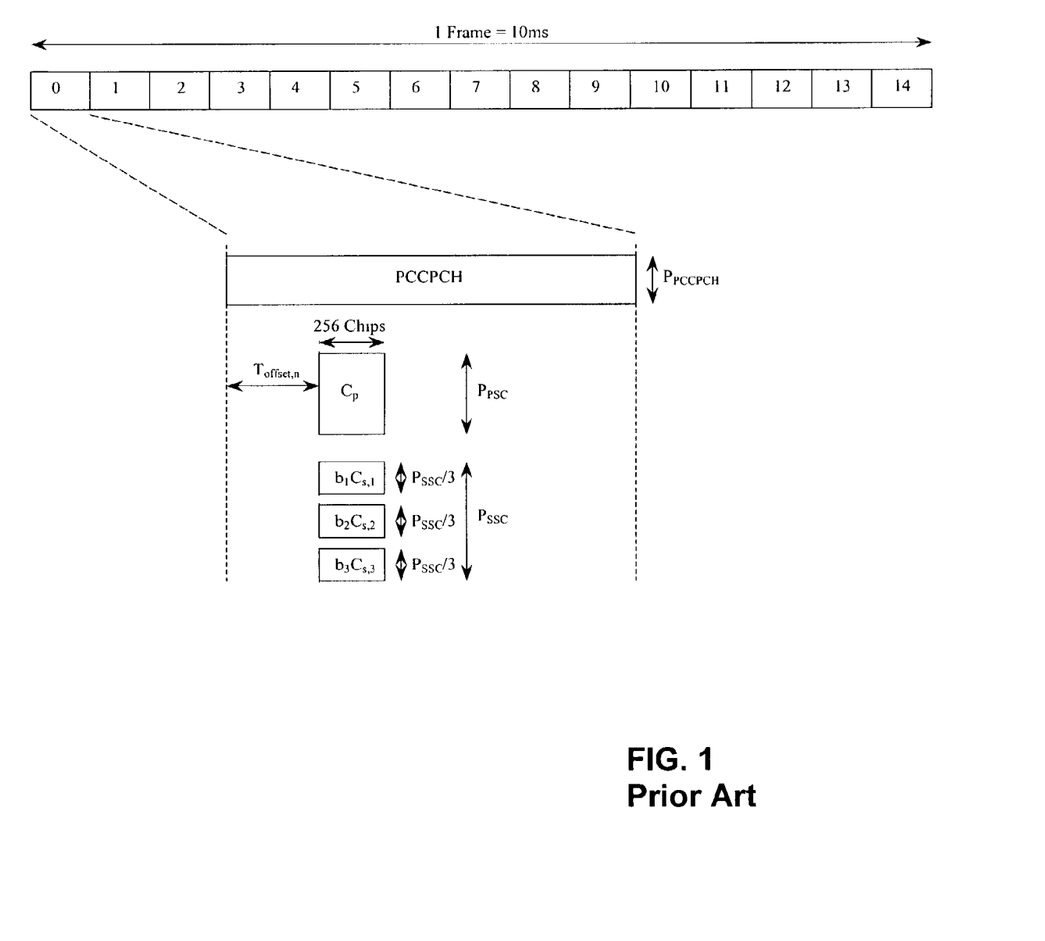
FIG. 1 shows in schematic form the format of SCH in UTRA TDD mode.

The general format of the SCH is shown schematically in FIG. 1. As shown, the primary synchronisation code (PSC), $C_p$, is a real-valued sequence of length 256 chips, transmitted at power $P_{PSC}$. The secondary synchronisation code (SSC), $C_{s,i}$(i=1, 2, 3), of length 256 is transmitted simultaneously with the $P_{SSC}$; the total power of the SSC is set to $P_{ssc}$. In addition these codes are multiplied by a complex value, $b_j$(j=0, 1, 2). The subscript s in $C_{s,i}$ refers to a code set, of which there 32, as specified in the technical specification '3GPP TS 25.223' publicly available on the website (www.3gpp.org) of the $3^{rd}$ Generation Partnership Project. The code sets, s, in conjunction with the complex multiplier values, $b_j$, are used to transfer the information bits to the UE.

The location of the SCH relative to the beginning of the time slot is defined by $t_{offset,n}$. It is calculated as follows:

$$t_{offset,n} = \begin{cases} n \cdot T_c \left\lfloor \frac{976-256}{15} \right\rfloor & n < 16 \\ \left(976 + 512 + (n-16)\left\lfloor \frac{976-256}{15} \right\rfloor\right)T_c & n \geq 16 \end{cases}$$

which can be simplified to:

$$t_{offset,n} = \begin{cases} n \cdot 48 \cdot T_c & n < 16 \\ (720 + n \cdot 48)T_c & n \geq 16 \end{cases}$$

where $T_c$ is the chip duration and n=0, 1, . . . , 31. The value of n is related to the code group and is obtained by demodulating the information on the SSC.

Encoding Information on SSC

The three codes that make up the SSC are QPSK (Quadrature Phase Shift Key) modulated and transmitted in parallel with the PSC. The QPSK modulation carries the following information:
- the code group that the base station belongs to (32 code groups: 5 bits; Cases 1, 2);
- the position of the frame within an interleaving period of 20 msec (2 frames: 1 bit, Cases 1, 2);
- the position of the SCH slot(s) within the frame (2 SCH slots: 1 bit, Case 2).

The SSCs are partitioned into two code sets for Case 1 and four code sets for Case 2. The set is used to provide the following information:

| Code Set Allocation for CASE 1 | |
|---|---|
| Code Set | Code Group |
| 1 | 0-15 |
| 2 | 16-31 |

The code group and frame position information is provided by modulating the secondary codes in the code set.

| Code Set Allocation for CASE 2 | |
|---|---|
| Code Set | Code Group |
| 1 | 0-7 |
| 2 | 8-15 |
| 3 | 16-23 |
| 4 | 24-31 |

The following SCH codes are allocated for each code set:

Case 1
  Code set 1: $C_1$, $C_3$, $C_5$.
  Code set 2: $C_{10}$, $C_{13}$, $C_{14}$.
Case 2
  Code set 1: $C_1$, $C_3$, $C_5$.
  Code set 2: $C_{10}$, $C_{13}$, $C_{14}$.
  Code set 3: $C_0$, $C_6$, $C_{12}$.
  Code set 4: $C_4$, $C_8$, $C_{15}$.

Code Allocation for CASE 1

Figure 2:
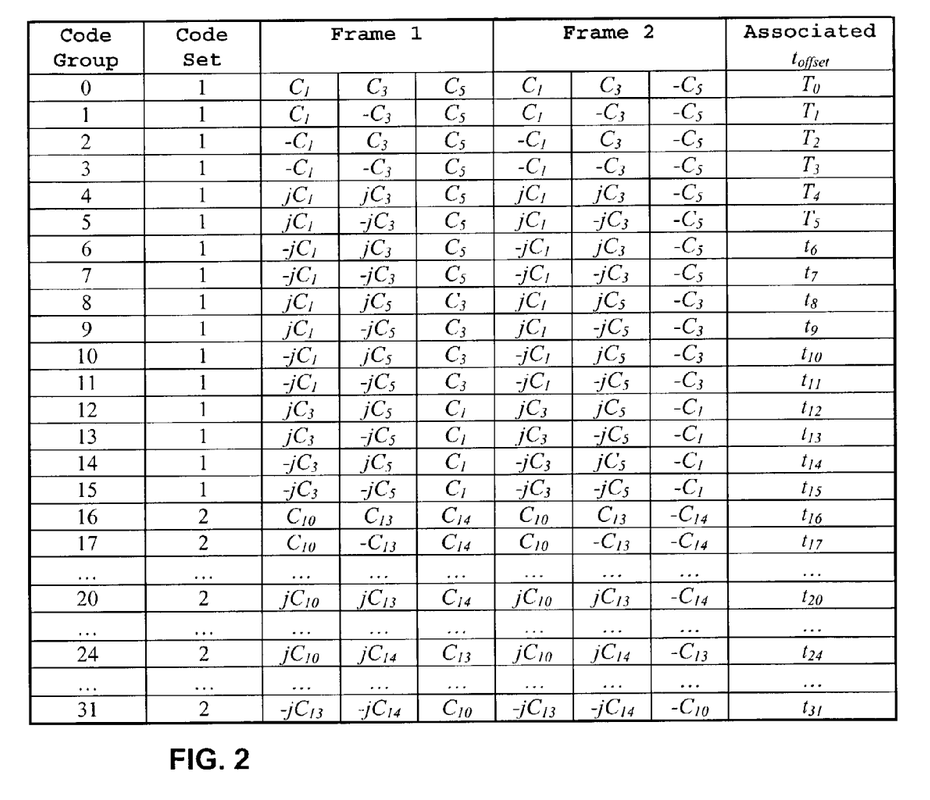
FIG. 2 shows in tabular form code allocation for CASE 1.

FIG. 2 shows a table illustrating code allocation for CASE 1.

It may be noted that the code construction for code groups 0 to 15 using only the SCH codes from code set 1 is shown. It will be understood that the construction for code groups 16 to 31 using the SCH codes from code set 2 is done in the same way.

Code Allocation for CASE 2

FIG. 3 shows a table illustrating code allocation for CASE 2.

It may be noted that the code construction for code groups 0 to 15 using the SCH codes from code sets 1 and 2 is shown. The construction for code groups 16 to 31 using the SCH codes from code sets 3 and 4 is done in the same way.

It will be understood that the conventional approach is to store the information defined in the tables of FIG. 2 and FIG. 3 in memory in the network and UE. It will be appreciated that, using this conventional approach, the amount of information needing to be stored may be considerable.

A novel procedure, which simplifies the above mapping process, is now presented.

Efficient Encoder for CASE 1

For ease of explanation, the following notation is introduced. If $C=(c_{\pi(0)},c_{\pi(1)},c_{\pi(2)})$ represents the permutation of the codes in the code set, where $\pi$ is the permutation, then the SSC associated with a code group is given by the component-wise product $$S_{ssc} = bC$$

where $S_{ssc}=(b_0 c_{\pi(0)}, b_1 c_{\pi(1)}, b_2 c_{\pi(2)})$ and $b_0, b_1, b_2 \in (\pm 1, \pm j)$.

Let $u=(u_0,u_1,u_2,u_3,u_4)^T$—the superscript T indicating matrix transposition—be the binary representation of the code group number, and define the following generator matrix $$G^1 = \begin{bmatrix} 0 & 0 & 0 & 0 & 0 & 1 \\ 0 & 0 & 0 & 1 & 0 & 0 \\ 0 & 1 & 0 & 0 & 0 & 0 \\ 1 & 0 & 1 & 0 & 0 & 0 \end{bmatrix}$$

with rows labelled $g_0^1, g_1^1, g_2^1, g_3^1$. We define a binary codeword as $$a = dG^1 + z \text{ modulo-2}$$

where $d = (f, u_0, u_1, u_2)^T$, $$f = \begin{cases} 0 & Frame1 \\ 1 & Frame2 \end{cases}$$

and $z = u_3(u_2+1)g_3^1$) reduced modulo-2. We map the elements of the codeword, a, pairwise to the set of integers (0, 1, 2, 3) using the expression $$s_k = 2a_{2k+1} + a_{2k};\ k=0, 1, 2, 3$$

where the sequence $s=(s_0, s_1, s_2)$ has an associated complex sequence $b=(j^{s_0}, j^{s_1}, j^{s_2})$.

The choice of code set and permutation is given by

TABLE 1

| $(u_4, u_3, u_2)$ | Code Group | Code Set Permutation |
|---|---|---|
| 000 | 0→3 | $c_1 c_3 c_5$ |
| 001 | 4→7 | $c_1 c_3 c_5$ |
| 010 | 8→11 | $c_1 c_5 c_3$ |
| 011 | 12→15 | $c_3 c_5 c_1$ |
| 100 | 16→19 | $c_{10} c_{13} c_{14}$ |
| 101 | 20→23 | $c_{10} c_{13} c_{14}$ |
| 110 | 24→27 | $c_{10} c_{14} c_{13}$ |
| 111 | 28→31 | $c_{13} c_{14} c_{10}$ |

Efficient Encoder for CASE 2

Define the following generator matrix $$G^2 = \begin{bmatrix} 0 & 0 & 0 & 0 & 0 & 1 \\ 0 & 1 & 0 & 1 & 0 & 0 \\ 0 & 0 & 0 & 1 & 0 & 0 \\ 1 & 0 & 1 & 0 & 0 & 0 \end{bmatrix}$$

with rows labelled $g_0^2, g_1^2, g_2^2, g_3^2$. We define a binary codeword as $$a = dG^2 + z \text{ modulo-2}$$

where $d = (K, f, u_0, u_1)^T$, $$K = \begin{cases} 0 & \text{slot } k \\ 1 & \text{slot } k+1 \end{cases}$$

and $z = u_2(u_1+1)g_3^2$ reduced modulo-2. The process follows in identical manner to case 1 with the exception that the permutation and code set map is changed to represent case 2, as shown below.

TABLE 2

| $(u_4, u_3, u_2, u_1)$ | Code Group | Code Set Permutation |
|---|---|---|
| 0000 | 0→1 | $c_1 c_3 c_5$ |
| 0001 | 2→3 | $c_1 c_3 c_5$ |

TABLE 2-continued

| $(u_4, u_3, u_2, u_1)$ | Code Group | Code Set Permutation |
|---|---|---|
| 0010 | 4→5 | $c_1 c_5 c_3$ |
| 0011 | 6→7 | $c_3 c_5 c_1$ |
| 0100 | 8→9 | $c_{10} c_{13} c_{14}$ |
| 0101 | 10→11 | $c_{10} c_{13} c_{14}$ |
| 0110 | 12→13 | $c_{10} c_{14} c_{13}$ |
| 0111 | 14→15 | $c_{13} c_{14} c_{10}$ |
| 1000 | 16→17 | $c_0 c_6 c_{12}$ |
| 1001 | 18→19 | $c_0 c_6 c_{12}$ |
| 1010 | 20→21 | $c_0 c_{12} c_6$ |
| 1011 | 22→23 | $c_6 c_{12} c_0$ |
| 1100 | 24→25 | $c_4 c_8 c_{15}$ |
| 1101 | 26→27 | $c_4 c_8 c_{15}$ |
| 1110 | 28→29 | $c_4 c_{15} c_8$ |
| 1111 | 30→31 | $c_8 c_{15} c_4$ |

Thus, it will be understood that only the data in the above tables 1 and 2 needs to be stored in memory, in order to allow the necessary secondary synchronisation channel encoding to be effected, following the encoding process described above, rather than having to store the data in tables of FIG. 2 and FIG. 3 as in the prior art.

Figure 4:
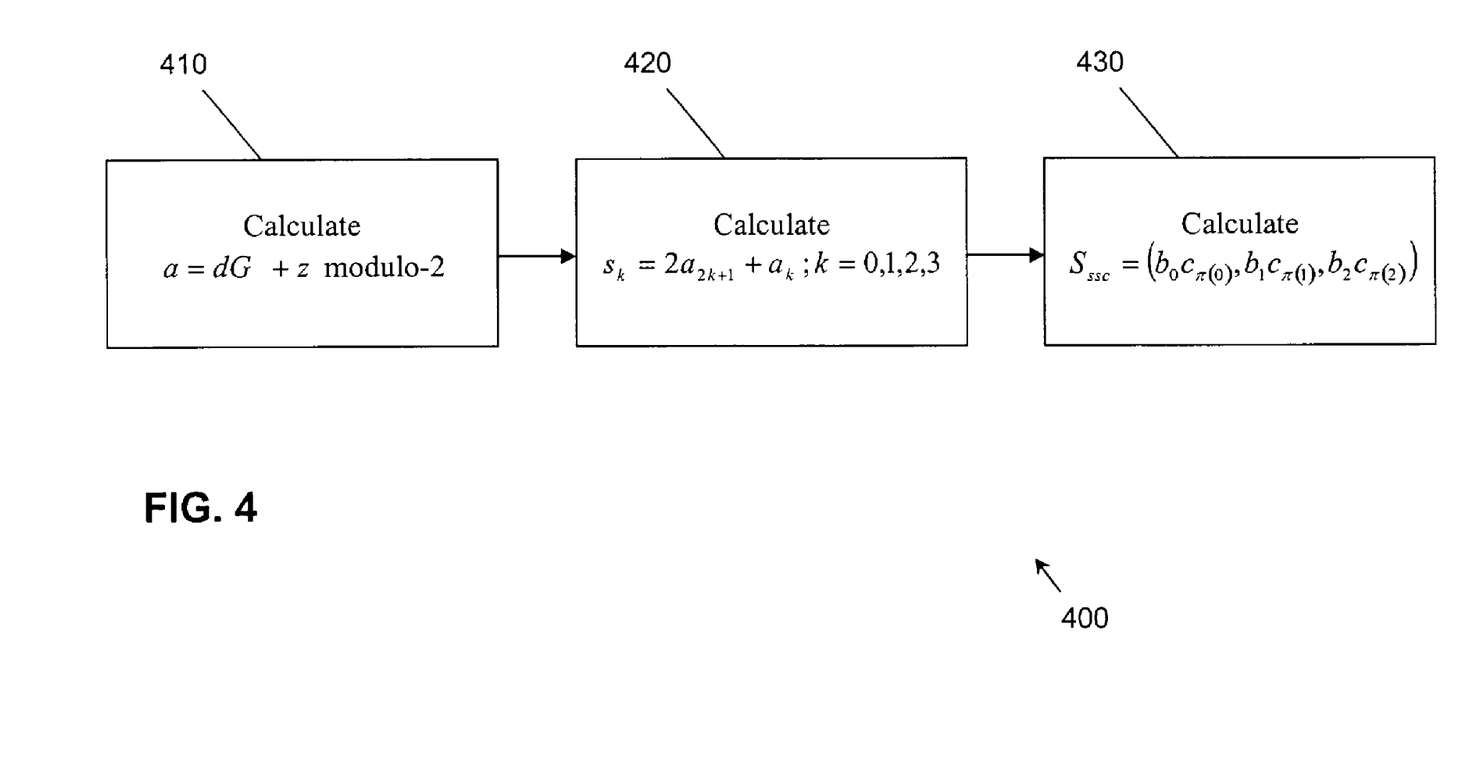
FIG. 4 shows in block schematic form an encoder incorporating the invention.

An efficient encoder 400 for carrying out the above processes for CASE 1 and CASE 2 is shown generally in FIG. 4. As can be seen in this figure, in block step 410 the binary codewords $a = dG + z$ modulo-2 are calculated. Next, in block 420, the expressions $s_k = 2a_{2k+1} + a_{2k};\ k=0, 1, 2, 3$ are calculated. Finally, in block 430, the secondary synchronisation codes $S_{SSC} = (b_0 c_{\pi(0)}, b_1 c_{\pi(1)}, b_2 c_{\pi(2)})$ are calculated.

Signalling Higher Chip Rate

As will be explained below, modification of the generator matrix allows encoding of the chip rate used in the cell.

Let $C_r$ denote the chip rate, where $$C_r = \begin{cases} 0 & 3.84\ Mcps \\ 1 & 7.68\ Mcps \end{cases}$$

We have the following:

CASE 1:

Define the following generator matrix $$G^1 = \begin{bmatrix} 0 & 0 & 0 & 0 & 1 & 0 \\ 0 & 0 & 0 & 0 & 0 & 1 \\ 0 & 0 & 0 & 1 & 0 & 0 \\ 0 & 1 & 0 & 0 & 0 & 0 \\ 1 & 0 & 1 & 0 & 0 & 0 \end{bmatrix}$$

and a binary codeword as $$a = dG^1 + z \text{ modulo-2}$$

where $d = (C_r, f, u_0, u_1, u_2)^T$ and $z = u_3(u_2+1)g_4^1$. We note that when $C_r$ is 0 the codeword produced by the generator matrix is unchanged. When $C_r$ is 1, denoting the higher chip rate, the third element of the sequence $b = (j^{s_0}, j^{s_1}, j^{s_2})$ becomes imaginary rather than real.

CASE 2:
Define the following generator matrix $$G^2 = \begin{bmatrix} 0 & 0 & 0 & 0 & 1 & 0 \\ 0 & 0 & 0 & 0 & 0 & 1 \\ 0 & 1 & 0 & 1 & 0 & 0 \\ 0 & 0 & 0 & 1 & 0 & 0 \\ 1 & 0 & 1 & 0 & 0 & 0 \end{bmatrix}$$

and a binary codeword as $$a = dG^2 + z \text{ modulo-2}$$

where $d=(C_r,K,f,u_0,u_1)^T$ and $z=u_2(u_1+1)g_4^2$. We note that when $C_r$ is 0 the codeword produced by the generator matrix is unchanged. When $C_r$ is 1, denoting the higher chip rate, the third element of the sequence $b=(j^{s_0},j^{s_1},j^{s_2})$ becomes imaginary rather than real.

It will be appreciated that the process for encoding described above will typically be carried out in software running on a processor (not shown), and that the software may be provided as a computer program element carried on any suitable data carrier (not shown) such as a magnetic or optical computer disc.

It will be appreciated that the encoder described above will typically be incorporated in a base station ('Node B'—not shown) and a mobile station ('UE'—not shown) of a UMTS system, with complementary decoding being provided in the 'UE' and 'Node B' respectively.

It will be understood that the encoder and method for efficient synchronisation channel encoding in UTRA TDD mode described above provides the following advantages:
- an efficient encoding architecture for the synchronisation channel in UTRA TDD mode
- in addition, by simple manipulation of the generation matrix, a higher chip rate signal may be signalled whilst still preserving the signalling information for the lower chip rate.

The invention claimed is:

1. A computer-implemented method for an encoder, for efficient synchronization channel (SCH) encoding in time division duplex (TDD) mode, comprising:
   producing a codeword a, where a=dG+z modulo-2, where d represents a predetermined code group to be encoded for synchronization channel encoding, G represents a predetermined generator matrix, and z represents a function of the code group number and a row of the generator matrix;
   producing values $s_k$ for synchronization channel encoding, and associated values $b_0,b_1,b_2$, wherein $s_k$ is a function of $a_{2k+1}$ and $a_{2k}$; k=0, 1, 2, 3; and
   producing a value $S_{SSC}$ associated with the code group for synchronization channel encoding, where $S_{ssc}=(b_0c_{\pi(0)}, b_1c_{\pi(1)}, b_2c_{\pi(2)})$, $c_\pi$ represents a code within the code group, and $b_0,b_1,b_2\epsilon(\pm 1,\pm j)$.

2. The method of claim 1, wherein the generator matrix in a first case is based upon the matrix:

$$\begin{bmatrix} 0 & 0 & 0 & 0 & 0 & 1 \\ 0 & 0 & 0 & 1 & 0 & 0 \\ 0 & 1 & 0 & 0 & 0 & 0 \\ 1 & 0 & 1 & 0 & 0 & 0 \end{bmatrix}.$$

3. The method of claim 1, wherein the generator matrix in a second case is based upon the matrix:

$$\begin{bmatrix} 0 & 0 & 0 & 0 & 0 & 1 \\ 0 & 1 & 0 & 1 & 0 & 0 \\ 0 & 0 & 0 & 1 & 0 & 0 \\ 1 & 0 & 1 & 0 & 0 & 0 \end{bmatrix}.$$

4. The method of claim 1 wherein in a first case:
   d comprises $(f,u_0,u_1,u_2)$, where f is 0 for a first frame and 1 for a second frame, $u_0,u_1,u_2$ represent bits from a binary representation of the code group number, and
   $z=u_3(u_2+1)g_3$ reduced modulo-2, where $g_3$ represents a row of the generator matrix.

5. The method of claim 1 wherein in a second case:
   d comprises $(K,f,u_0,u_1)$, where K is 0 for a $k^{th}$ slot and 1 for a $(k+1)^{th}$ slot, f is 0 for a first frame and 1 for a second frame, $u_0,u_1,u_2$ represent bits from a binary representation of the code group number, and
   $z=u_2(u_1+1)g_3$ reduced modulo-2, where $g_3$ represents a row of the generator matrix.

6. The method of claim 1, wherein the values $s_k=2a_{2k+1}+a_{2k}$; k=0, 1, 2, 3.

7. A computer-implemented method for an encoder, for efficient synchronization channel (SCH) encoding in time division duplex (TDD) mode, comprising:
   producing a codeword from a predetermined code group to be encoded for synchronization channel encoding, a predetermined generator matrix G, and a function of the code group number and a row of the generator matrix, and
   producing a value $S_{ssc}$ associated with the code group for synchronization channel encoding, where $S_{ssc}=(b_0c_{\pi(0)}, b_1c_{\pi(1)},b_2c_{\pi(2)})$, $c_\pi$ represents a code within the code group, and $b_0,b_1,b_2\epsilon(\pm_1,\pm j)$,
   wherein the generator matrix has values such that a parameter produced therefrom changes between a first value indicating a first chip rate and a second value indicating a second chip rate.

8. The method of claim 7, wherein the generator matrix in a first case is based upon the matrix:

$$\begin{bmatrix} 0 & 0 & 0 & 0 & 1 & 0 \\ 0 & 0 & 0 & 0 & 0 & 1 \\ 0 & 0 & 0 & 1 & 0 & 0 \\ 1 & 0 & 1 & 0 & 0 & 0 \end{bmatrix}.$$

9. The method of claim 7, wherein the generator matrix in a second case is based upon the matrix:

$$\begin{bmatrix} 0 & 0 & 0 & 0 & 1 & 0 \\ 0 & 0 & 0 & 0 & 0 & 1 \\ 0 & 0 & 0 & 1 & 0 & 0 \\ 1 & 0 & 1 & 0 & 0 & 0 \end{bmatrix}.$$

10. The method of claim 7, wherein the codeword a, is represented by a=dG+z modulo-2, where d represents a predetermined code group to be encoded, G represents a predetermined generator matrix, and z represents a function of the code group number and a row of the generator matrix.

11. The method of claim 10 wherein in a first case:
   d comprises $(C_r,f,u_0,u_1,u_2)$, where $C_r$ represents a bit indicative of chip rate, f is 0 for a first frame and 1 for a second frame, $u_0,u_1,u_2$ represent bits from a binary representation of the code group number, and
   $z=u_3(u_2+1)g_4$ reduced modulo-2, where $g_4$ represents a row of the generator matrix.

12. The method of claim 10 wherein in a second case:
   d comprises $(C_r,K,f,u_0,u_1)$, where $C_r$ represents a bit indicative of chip rate, K is 0 for a $k^{th}$ slot and 1 for a $(k+1)^{th}$ slot, f is 0 for a first frame and 1 for a second frame, $u_0,u_1,u_2$ represent bits from a binary representation of the code group number, and
   $z=u_2(u_1+1)g_4$ reduced modulo-2, where $g_4$ represents a row of the generator matrix.

13. An encoder for efficient synchronisation channel encoding in UTRA TDD mode, comprising:
   means for producing a codeword a, where $a=dG+z$ modulo-2, where d represents a predetermined code group to be encoded, G represents a predetermined generator matrix, and z represents a function of the code group number and a row of the generator matrix,
   means for producing values $s_k$, and associated values $b_0,b_1,b_2$, wherein $s_k$ is a function of $a_{2k+1}$ and $a_{2k}$; k=0, 1, 2, 3, and
   means for producing a value $S_{ssc}$ associated with the code group, where $S_{ssc}=(b_o c_{\pi(0)}, b_1 c_{\pi(1)}, b_2 C_{\pi(2)})$, $c_\pi$ represents a code within the code group, and $b_0,b_1,b_2\epsilon(\pm 1, \pm j)$.

14. The encoder of claim 13, wherein the generator matrix in a first case is based upon the matrix:

$$\begin{bmatrix} 0 & 0 & 0 & 0 & 0 & 1 \\ 0 & 0 & 0 & 1 & 0 & 0 \\ 0 & 1 & 0 & 0 & 0 & 0 \\ 1 & 0 & 1 & 0 & 0 & 0 \end{bmatrix}.$$

15. The encoder of claim 13, wherein the generator matrix in a second case is based upon the matrix:

$$\begin{bmatrix} 0 & 0 & 0 & 0 & 0 & 1 \\ 0 & 1 & 0 & 1 & 0 & 0 \\ 0 & 0 & 0 & 1 & 0 & 0 \\ 1 & 0 & 1 & 0 & 0 & 0 \end{bmatrix}.$$

16. The encoder of claim 13 wherein in a first case:
   d comprises $(f,u_0,u_1,u_2)$, where f is 0 for a first frame and 1 for a second frame, $u_0,u_1,u_2$ represent bits from a binary representation of the code group number, and
   $z=u_3(u_2+1)g_3$ reduced modulo-2, where $g_3$ represents a row of the generator matrix.

17. The encoder of claim 13 wherein in a second case:
   d comprises $(K,f,u_0,u_1)$, where K is 0 for a $k^{th}$ slot and 1 for a $(k+1)^{th}$ slot, f is 0 for a first frame and 1 for a second frame, $u_0,u_1,u_2$ represent bits from a binary representation of the code group number, and
   $z=u_2(u_1+1)g_3$ reduced modulo-2, where $g_3$ represents a row of the generator matrix.

18. The method of claim 13, wherein the values $s_k=2a_{2k+1}+a_{2k}$; k=0, 1, 2, 3.

19. An encoder for efficient synchronisation channel encoding in Universal Terrestrial Radio Access time division duplex (UTRA TDD) mode, comprising:
   means for producing a codeword from a predetermined code group to be encoded, a predetermined generator matrix G, and a function of the code group number and a row of the generator matrix, and
   means for producing a value $S_{ssc}$ associated with the code group, where $S_{ssc}=(b_o c_{\pi(0)}, b_1 c_{\pi(1)}, b_2 c_{\pi(2)})$, $c_\pi$ represents a code within the code group, and $b_0,b_1,b_2\epsilon(\pm 1, \pm j)$,
   wherein the generator matrix has values such that a parameter produced therefrom changes between a first value indicating a first chip rate and a second value indicating a second chip rate.

20. The encoder of claim 19, wherein the generator matrix in a first case is based upon the matrix:

$$\begin{bmatrix} 0 & 0 & 0 & 0 & 1 & 0 \\ 0 & 0 & 0 & 0 & 0 & 1 \\ 0 & 0 & 0 & 1 & 0 & 0 \\ 0 & 1 & 0 & 0 & 0 & 0 \\ 1 & 0 & 1 & 0 & 0 & 0 \end{bmatrix}.$$

21. The encoder of claim 19, wherein the generator matrix in a second case is based upon the matrix:

$$\begin{bmatrix} 0 & 0 & 0 & 0 & 1 & 0 \\ 0 & 0 & 0 & 0 & 0 & 1 \\ 0 & 1 & 0 & 1 & 0 & 0 \\ 0 & 0 & 0 & 1 & 0 & 0 \\ 1 & 0 & 1 & 0 & 0 & 0 \end{bmatrix}.$$

22. The encoder of claim 19, wherein the codeword a, is represented by $a=dG+z$ modulo-2, where d represents a predetermined code group to be encoded, G represents a predetermined generator matrix, and z represents a function of the code group number and a row of the generator matrix.

23. The encoder of claim 22 wherein in a first case:
   d comprises $(C_r,f,u_0,u_1,u_2)$, where $C_r$ represents a bit indicative of chip rate, f is 0 for a first frame and 1 for a second frame, $u_0,u_1,u_2$ represent bits from a binary representation of the code group number, and
   $z=u_3(u_2+1)g_4$ reduced modulo-2, where $g_4$ represents a row of the generator matrix.

24. The encoder of claim 22 wherein in a second case:
   d comprises $(C_r,K,f,u_0,u_1)$, where $C_r$ represents a bit indicative of chip rate, K is 0 for a $k^{th}$ slot and 1 for a $(k+1)^{th}$ slot, f is 0 for a first frame and 1 for a second frame, $u_0,u_1,u_2$ represent bits from a binary representation of the code group number, and
   $z=u_2(u_1+1)g_4$ reduced modulo-2, where $g_4$ represents a row of the generator matrix.

25. A wireless base station for use for efficient synchronization channel encoding in time division duplex mode in a UMTS system, comprising:
   means for producing a codeword a, where $a=dG+z$ modulo-2, where d represents a predetermined code group to be encoded, G represents predetermined generator matrix, and z repesents a function of the code group number and a row of the generator matrix, means for producing values $s_k$, and associated values $b_0, b_1, b_2$, wherein $s_k$ is a function of $a_{2k+1}$ and $a_{2k}$; k=0, 1, 2, 3, and means for producing a value $S_{ssc}$, and associated with the code group, where $S_{ssc}=(b_o c_{\pi(0)}, b_1 c_{\pi(1)}, b_2 c_{\pi(2)})$, $c_\pi$ represents a code within the code group, and $b_0, b_1, b_2 \epsilon (\pm 1, \pm j)$.

26. A computer readable medium encoded with program code for performing the method of:

producing a codeword a, where a=dG+z modulo-2, where d represents a predetermined code group to be encoded, for synchonization channel encoding, G represents a predetermined generator matrix, and z repesents a function of the code group number and a row of the generator matrix, producing values $s_k$, for synchronization channel encoding, and associated values $b_0, b_1, b_2$, wherein $s_k$ is a function of $a_{2k+1}$ and $a_{2k}$; k=0, 1, 2, 3, and producing a value $S_{ssc}$ associated with the code group for for synchonization channel encoding, where $S_{ssc}=(b_o c_{\pi(0)}, b_1 c_{\pi(1)}, b_2 c_{\pi(2)})$, $c_\pi$ represents a code within the code group, and $b_0, b_1, b_2 \epsilon (\pm 1, \pm j)$.

* * * * *

UNITED STATES PATENT AND TRADEMARK OFFICE
CERTIFICATE OF CORRECTION

PATENT NO. : 7,301,930 B2  Page 1 of 1
APPLICATION NO. : 10/241966
DATED : November 27, 2007
INVENTOR(S) : Alan E. Jones et al.

It is certified that error appears in the above-identified patent and that said Letters Patent is hereby corrected as shown below:

In the Claims:

Column 8, Line 56, Claim 9 delete " $\begin{bmatrix} 000010 \\ 000001 \\ 000100 \\ 101000 \end{bmatrix}$ " and insert -- $\begin{bmatrix} 000010 \\ 000001 \\ 010100 \\ 101000 \end{bmatrix}$ --

Column 9, Line 18, Claim 13 delete "UTRA TDD" and insert --time division duplex--

Column 11, Line 4, Claim 25 delete ", and"

Column 11, Line 11, Claim 26 delete "encoded," and insert --encoded--

Signed and Sealed this

Thirteenth Day of October, 2009

David J. Kappos
*Director of the United States Patent and Trademark Office*